United States Patent [19]
Harding

[11] Patent Number: 4,792,995
[45] Date of Patent: Dec. 20, 1988

[54] BIDIRECTIONAL ROLLER DECK CONTROL FOR A SELF GUIDED VEHICLE

[75] Inventor: Joseph J. Harding, Mentor, Ohio

[73] Assignee: Caterpillar Industrial Inc., Mentor, Ohio

[21] Appl. No.: 87,048

[22] Filed: Aug. 19, 1987

[51] Int. Cl.$^4$ .............................................. H04B 9/00
[52] U.S. Cl. .................................... 455/606; 414/351; 414/398; 455/603; 455/617
[58] Field of Search .................... 370/3; 455/603, 604, 455/606, 607, 608, 617; 414/265, 272, 273, 278, 351, 353, 398, 468, 499, 502, 507, 518, 574

[56] References Cited
U.S. PATENT DOCUMENTS

| | | | |
|---|---|---|---|
| 4,492,504 | 1/1987 | Hainsworth | 414/273 |
| 4,680,811 | 7/1987 | Harper et al. | 455/617 |
| 4,691,385 | 9/1987 | Tupman | 455/607 |

FOREIGN PATENT DOCUMENTS

| | | | |
|---|---|---|---|
| 56-8722A | 1/1981 | Japan | 414/351 |
| 0216641 | 10/1985 | Japan | 455/607 |

Primary Examiner—Robert L. Griffin
Assistant Examiner—Leslie Van Beek
Attorney, Agent, or Firm—Terry D. Morgan; Robert E. Muir

[57] ABSTRACT

A self guided vehicle has a roller deck controllably powered by an electric motor to accept and deliver loads on both the left and right side of the vehicle. An infrared communication system is employed to coordinate the overall transfer of these loads between the vehicle and a docking station. The communication system performs the multiple functions of locating the docking station relative to the left and right side of the vehicle, determining the direction the load is to be transferred, and controlling the direction of motor rotation to effect such a transfer.

10 Claims, 6 Drawing Sheets

BIDIRECTIONAL ROLLER DECK CONTROL FOR A SELF GUIDED VEHICLE

TECHNICAL FIELD

This invention relates generally to an apparatus for controlling a powered roller deck of a self guided vehicle and more particularly to an apparatus for determining the direction of operation of a powered roller deck of a self guided vehicle.

BACKGROUND ART

In the field of self guided vehicles (SGV), the degree of flexibility is often a key factor in determining the usefulness of the system. For example, it is commonplace for an SGV to employ a powered roller deck to deposit and accept loads at similarly powered conveyor systems. To allow for the expedient transfer of these loads, prior systems have advantageously employed infrared communication systems between the SGV and the conveyor (see U.S. patent application Ser. No. 773,141 filed Sept. 5, 1985 by Tupman et al, now U.S. Pat. No. 4,691,385).

However, these systems typically allow for loading and unloading from only one side of the vehicle. This single sided capability limits the possible aprroach paths of the vehicle to the conveyor to only two directions (forward and reverse). Accordingly, this limitation forces the vehicle to turn around prior to docking with the conveyor. The factory environment is not always so forgiving, as to provide sufficient maneuvering space for the vehicle to turn around. Therefore, it would be advantageous for an SGV to be able to approach a conveyor from any of the four possible directions, dock with the conveyor, and automatically determine the direction the roller deck must be rotated to deposit or accept the load.

The present invention is directed to overcoming one or more of the problems as set forth above.

DISCLOSURE OF THE INVENTION

In one aspect of the present invention, an apparatus for controlling the operation of a powered roller deck of a self guided vehicle in coordination with a powered roller deck of a docking station is provided. The apparatus includes the roller decks having a plurality of rollers rotatably connected to and driven by electric motors. First and second radiant energy emitting means produce pulsed radiant energy in response to receiving respective pulse control signals. The first and second radiant energy emitting means are mounted on opposing sides of the vehicle and generally directed away from the vehicle. A third radiant energy emitting means similarly produces pulsed radiant energy in response to receiving a pulse control signal; however, the third radiant energy emitting means is mounted on the docking station and generally directed toward the vehicle. First and second radiant energy detecting means produce electrical signals responsive to receiving radiant energy from the third radiant energy emitting means and the first and second radiant energy detecting means are mounted on opposing sides of the vehicle and generally directed away from the vehicle. A third radiant energy detecting means similarly produces electrical signals in response to receiving radiant energy from one of the first and second radiant energy emitting means and the third radiant energy detecting means is mounted on the docking station and generally directed toward the vehicle. A vehicle control means delivers pulse control signals to the first and second radiant energy emitting means, monitors the first and second radiant energy detecting means for a preselected period of time, and controls the direction of energization of the vehicle electric motor responsive to receiving an electrical signal from one of the first and second radiant energy detecting means.

The instant invention advantageously provides bidirectional loading and unloading capability to self guided vehicles. Such an arrangement has advantages in increasing the flexibility of the paths used by the vehicle and is especially advantageous in those instances where the vehicle has limited space for maneuvering.

BRIEF DESCRIPTION OF THE DRAWINGS

For a better understanding of the present invention, reference may be had to the accompanying drawings, in which.

BEST MODE FOR CARRYING OUT THE INVENTION

Figure 1:
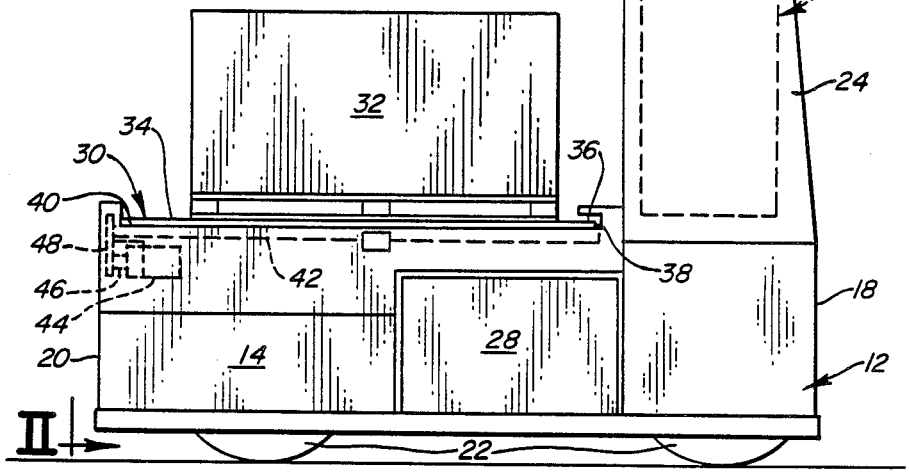
FIG. 1 is a diagrammatic side elevational view of an embodiment of the present invention showing a self guided material handling vehicle.

Referring first to FIG. 1, an apparatus embodying certain of the principles of the present invention is generally indicated by the reference numeral 8. It should be understood that the following detailed description relates to the best presently known embodiment of the apparatus 8. However, the apparatus 8 can assume numerous other embodiments, as will become apparent to those skilled in the art, without departing from the appended claims.

Figure 2:
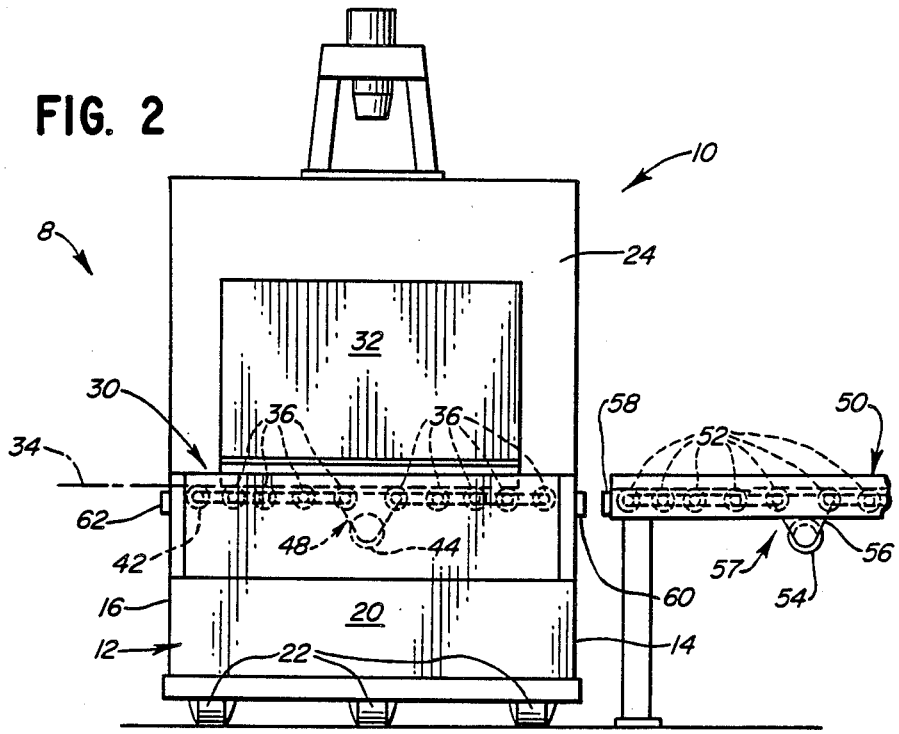
FIG. 2 is a diagrammatic rear elevational view taken along lines II—II of FIG. 1 showing the vehicle in greater detail, and showing a load transfer station positioned adjacent the vehicle first side for receiving the carried on the vehicle.

In FIGS. 1 and 2 a material handling vehicle 10 having a frame 12, first and second spaced apart sides 14,16, add front and rear end portions 18,20 is shown. The material handling vehicle depicted is driverless, computer controlled, and commonly referred to as a self guided vehicle (SGV). It should be noted that the invention is particularly suited for use on a free ranging SGV but should not be limited to this use, as it can be advantageously employed on other material handling vehicles, such as driver operated material handling carriers and transporters, towed trailers, wire and stripe following automatic guided vehicles, and the like.

The vehicle 10 has a plurality of ground engaging wheels 22 which are rotatably connected to the frame 12. A tower portion 24 houses an on board control system 26 capable of controlling vehicle drive functions, navigation functions, load manipulation functions, and the like. A source of power 28, for example, a storage battery is provided for powering the vehicle drive system (not shown), as well as the control system 26, and other vehicle systems.

A means 30 is provided for supporting a load 32 on the frame 12 at a location between the first and second sides 14,16. The load supporting means 30 defines a supporting surface plane 34 which extends at an angle to the first and second sides 14,16. Preferably, the load supporting means 30 includes a plurality of elongate consecutively arranged rollers 36 having first and second spaced apart end portions 38,40, and a cylindrical outer surface 42. The rollers 36 are each rotatably connected at the first and second end portions 38,40 to the frame 12 at spaced apart locations on the frame 12. Further, the rollers 36 are oriented so that the outer cylindrical surfaces 42 are substantially parallel to each other and extend transverse the front and rear frame end portions 18,20. It is to be noted that the load supporting means 30 may include other embodiments, including stationary decks, elevationally movable decks, conveyor decks, and the like without departing from the spirit of the invention. The rollers 3 suitably guide movement of the load 32 in a first direction transverse the first side 4 and in a second direction transverse the second side 16.

A roller drive motor 44 is connected to the power source 28, controlled by the system 26, and mounted on the frame 12. The roller drive motor 44 has an output shaft 46 connected to a chain and sprocket arrangement 48 of conventional design. The chain and sprocket arrangement is connected to the rollers 36 in any manner suitable for transmitting rotary motion from the shaft 46 to rotary motion of the rollers 36. The rollers 36 are rotatable about their own longitudinal axis in response to rotation of the motor output shaft 46. The roller drive motor 44 is preferably a reversible electric motor capable of driving the rollers 36 in either clockwise or counterclockwise directions. The direction of rotation of the roller drive motor 44 and ultimately the rollers 36 is established by the control system 26.

A docking station 50 is shown in FIG. 2 positioned immediately adjacent the right side of the vehicle 10. The docking station 50 includes a plurality of rollers 52 rotatably connected to and driven by an electric motor 54 and chain and sprocket arrangement 56. This arrangement is a roller deck 57 generally similar to the corresponding roller deck 30 of the vehicle 10. In fact, the control systems for the two roller decks can be considered to be identical, as will become apparent in conjunction with the description of FIGS. 3 and 4. When the vehicle 10 is properly positioned at the docking station 50, the rollers 52 are generally parallel to the vehicle rollers 36, thereby enabling the powered rollers 36,52 to transfer loads therebetween.

To coordinate this transfer of loads between the vehicle 10 and docking station 50 it is advantageous to determine when the vehicle 10 is properly positioned relative to the docking station 50 and that each "knows" the intentions of the other. That is, the docking station 50 and vehicle 10 must both "know" which direction the load is to be transferred. To facilitate this interaction, a sensor 58 is provided on the docking station 50. The sensor 58 generally aligns with a pair of sensors 60,62 positioned on opposing sides of the vehicle 10. By using the two sensors 60,62 on the vehicle 10, the vehicle 10 is freed to approach the docking station 50 in any of four directions. For example, the vehicle 10 can approach in either the forward or reverse directions with the right side of the vehicle adjacent the docking station 50. Similarly, the vehicle 10 can also approach in either the forward or reverse directions with the left side of the vehicle adjacent the docking station 50. This flexibility reduces the amount of maneuvering the vehicle 10 must perform to properly position itself a the docking station 50.

Figure 3:
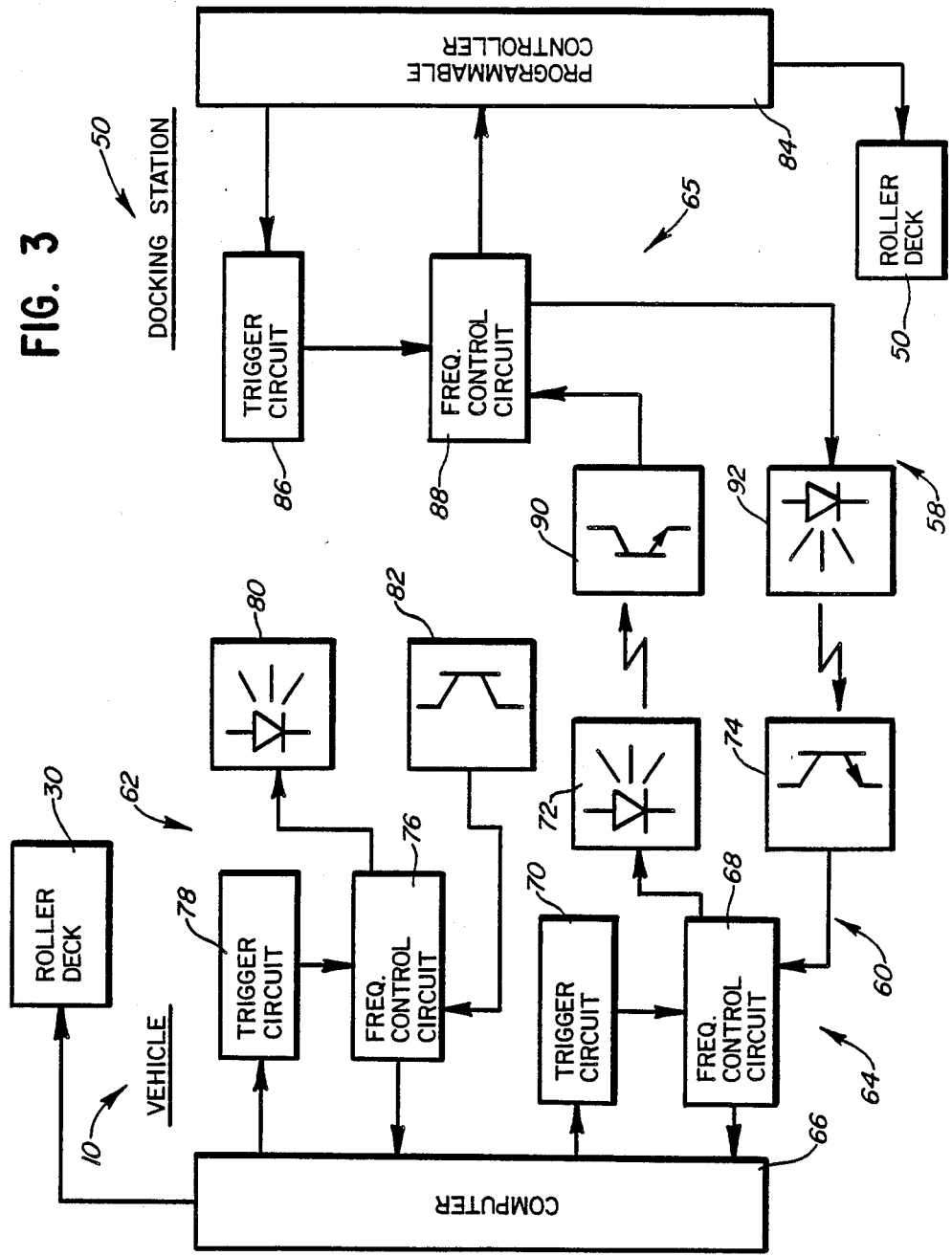
FIG. 3 is a block diagram of a communication apparatus embodying a portion of the present invention.

In FIG. 3, a bidirectional communication system is shown which includes a control means 64 associated with the vehicle 10 and a control means 65 associated with a corresponding docking station 50. The vehicle control means 64 includes a microprocessor 66 connected to the sensors 60,62. The sensor 60 includes a first frequency control means 68 connected to a first trigger means 70. First radiant energy emitting means 72 and radiant energy detecting means 74 are connected to the first frqquency control means 68. Similarly, the second sensor 62 includes a frequency control maans 76 connected to a second trigger means 78. Second radiant energy emitting means 80 and radiant energy detecting means 82 are connected to the first frequency control means 76.

The docking station 50 includes a programmable controller 84 connected through a third trigger means 86 to a third frequency control means 88. Third radiant energy emitting means 92 and radiant energy detecting means 90 are connected to the second frequency control means 88. The programmable controller 84 is, of course, simply a computer especially suited to an industrial environment, and can be replaced by any suitable computer system.

Figure 4:
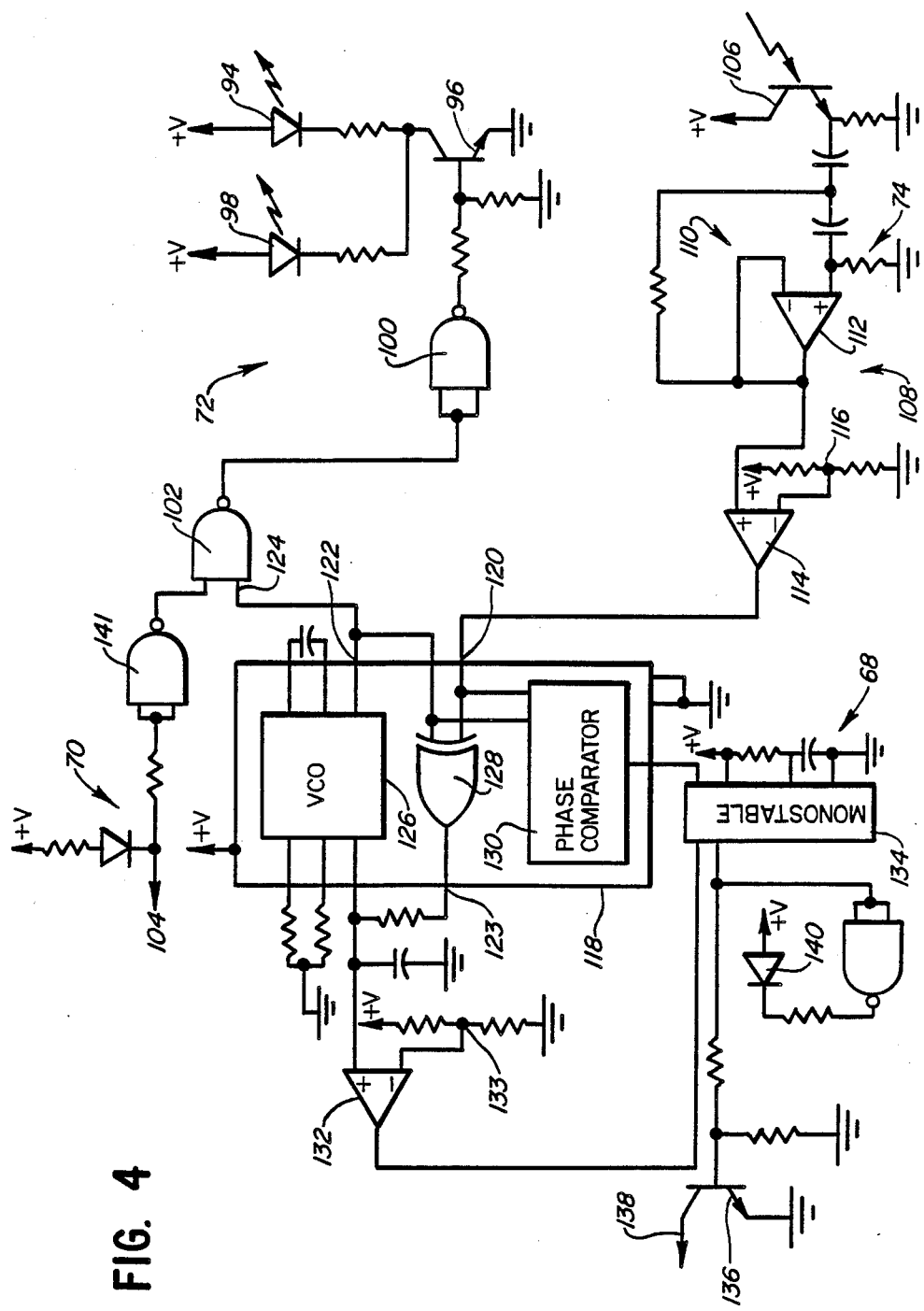
FIG. 4 is a schematic diagram of one embodiment of the present invention as shown in FIG. 1.

Referring next to FIG. 4, an embodiment of the sensor 64 is shown in schematic form. FIG. 4 is a central circuit diagram common to both the vehicle 10 and the docking station 50. In other words, both the vehicle 10 and the docking station 50 include a circuit identical to that presented in FIG. 2. Moreover, the vehicle 10 includes two of such circuits, one associated with each of the sensors 60,62. To avoid redundancy, only one such circuit is set forth in the drawings.

The first radiant energy emitting means 72 includes a light emitting diode 94 connected from a supply voltage through a current limiting resistor and a transistor 96 to circuit ground. A second light emitting diode 98 and associated current limiting resistor is connected in parallel with the light emitting diode 94. The input to the transistor 96 is connected through a resistor biasing network and an inverter 100 to a logic gate 102. The logic gate 102 is, for example, a dual input NAND gate. One input terminal of the logic gate 102 is the "trigger" input circuit terminal 104 connected directly to the microprocessor 66.

The first radiant energy detecting means 74 produces electrical signals responsive to received radiant energy. The first radiant energy detecting means 74 includes a phototransistor 106 connected through a current limiting resistor between supply voltage and circuit ground. The first radiant energy detecting means 74 includes a pulse discrimination means 108 for passing electrical signals produced by the first radiant energy detecting means 74 in response to receiving pulsed radiant energy having a pulse frequency greater than a predetermined frequency, and blocking electrical signals produced in response to the first radiant energ detecting means 74 receiving radiant energy having a pulse frequency less than the predetermined frequency. The pulse discrimination means 108 includes a high pass filter circuit 110 having an amplifier 112 connected through a resistor/capacitor network to the phototransistor 106. The output terminal of the amplifier 112 is connected to a first input terminal of a comparator 114. The second input terminal of the comparator 114 is connected to a voltage divider 116.

The first frequency control means 68 receives the electrical signals from the first radiant energy detecting means 74, produces pulse control signals having a nominal frequency which is variable within a predetermined frequency range, controllably delivers the produced pulse control signals at the nominal frequency to the first radiant energy emitting means 72 in the absence of receiving the electrical signal, and automatically adaptively modifies the frequency of the produced pulse control signals in response to receiving the electrical signals. The first frequency control means 68 includes a phase looked loop circuit 118 having a frequency input terminal 120 connected to the output terminal of the amplifier 114, and a frequency output terminal 122 connected to a second input terminal 124 of the logic gate 102. The phase locked loop 118 is, for example, an integrated circuit such as industry standard type 4046, and includes a voltage controlled oscillator 126, a first phase comparator 128, and a second phase comparator 130.

The phase locked loop frequency input terminal 120 is connected to one input of each of the first and second phase comparators 128,130. The phase locked loop frequency output terminal 122 is connected to a second input terminal of each of the first and second phase comparators 128,130. A signal output terminal 123 of the first phase comparator 128 is connected to an input terminal of the voltage controlled oscillator 126. The signal output terminal 123 of the first phase comparator 128 is also connected to an input terminal of a comparator 132. A second input terminal of the comparator 132 is connected to a voltage divider 133. An output terminal of the voltage comparator 132 is connected to an input terminal of a monostable multivibrator 134. A second input terminal of the monostable multivibrator 134 is connected to an output terminal of the secnnd phase comparator 130. An output terminal of the monostable multivibrator 134 is connected through a resistor biasing network to an output transistor 136. The output transistor 136 is connected to a "receive" output terminal 138 which, like terminal 104, is connected to an input port of the microprocessor 66. A light emitting diode 140 is also connected through an inverter to the output terminal of the monostable multivibrator 134.

The first trigger means 70 includes a logic gate 141 having an input terminal connected through a biasing network to the microprocessor 66, and having an output terminal connected to an input of the logic gate 102.

The above description of FIG. 4 discusses each of the main circuit components of the vehicle communications apparatus shown in the block diagram of FIG. 3. Each of these circuit components is repeated within the sensors 58,60. Similarly, FIG. 3 also illustrates the vehicle roller deck 30 and the docking station roller deck 57 as being respectively controlled by the microprocessor 66 and programmable controller 84. Both control systems are substantially similar; accordingly, only the vehicle roller deck control system will be discussed in detail to avoid repetition.

Figure 5:
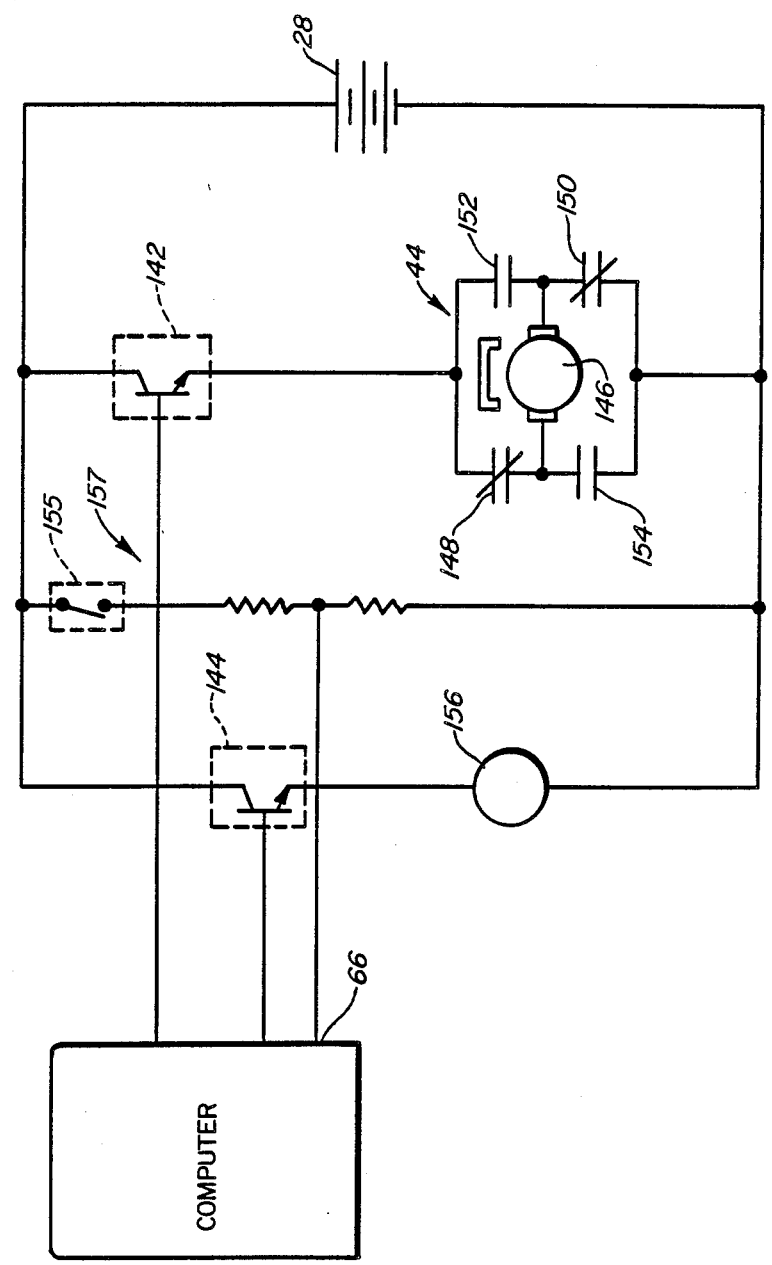
FIG. 5 is a schematic of the electronic drive circuitry of the present invention.

FIG. 5 generally shows the vehicle roller deck control system and includes the microprocessor 66 having a pair of output ports connected to a pair of switching means 142,144. The switching means 142 is connected intermediate the vehicle battery 28 and the roller deck motor 44. The switching means 142 is of the transistor type and preferably includes a Darlington pair. The motor 44 is preferably a permanent magnet motor and includes an armature 146 connected to an arrangement of solenoid controlled contactors 148,150,152,154. The contactors are operated in pairs 148,150:152,154 to reverse the flow of current through the armature 146 and provide first and second directions of rotation. For example, the contactors 148,150 are normally closed and allow current to flow from the battery 28, through the switching means 142, contactor 148, armature 146, and contactor 150. The microprocessor 66 can reverse the flow of current by energizing the solenoid 156 which opens normally closed contactors 148,150 and closes normally open contactors 152,154. Now, current flows from the battery 28, through the switching means 142, contactor 152, armature 146, and contactor 154. Energization of the solenoid 156 is effected by biasing the switching means 144 to the conducting state and connecting the solenoid 156 to the vehicle battery 28. The microprocessor 66 can also control the speed of the motor 44 by pulse width modulating the control signal delivered to the switching means 142.

Means 157 detects the presence of a load on the vehicle roller deck 30 and delivers a load received signal. The means 157 includes a switching element 155 located on the roller deck 30 and positioned so as to close when the load 32 is properly positioned on the roller deck 30, i.e. fully-on. The switching element 155 can include, for example, a microswitch, an optical switch, an inductive switch, or the like.

Industrial Applicability

Figure 6A:
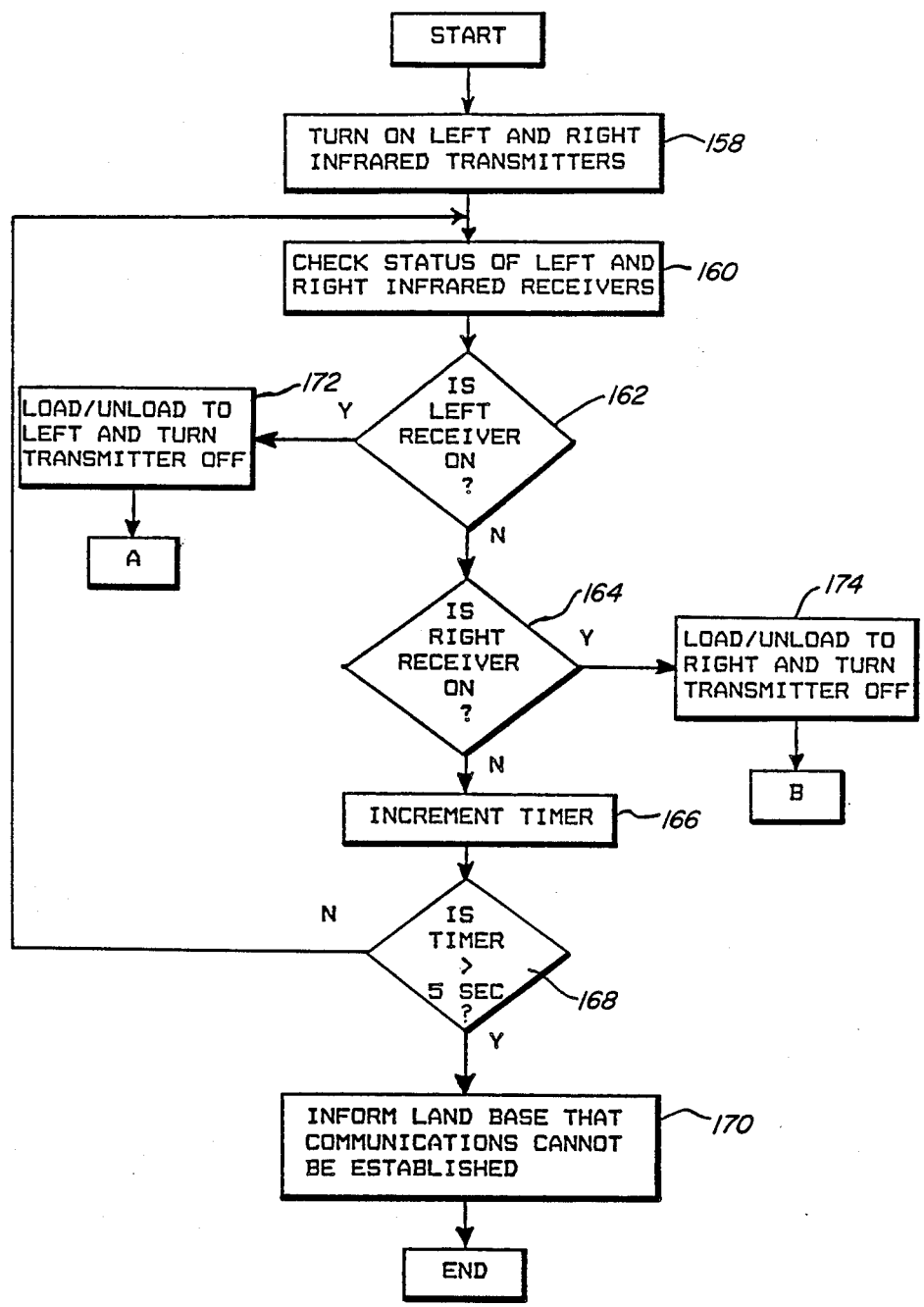
FIGS. 6A and 6B are flow chart representations of the software employed in the present invention.
Figure 6B:
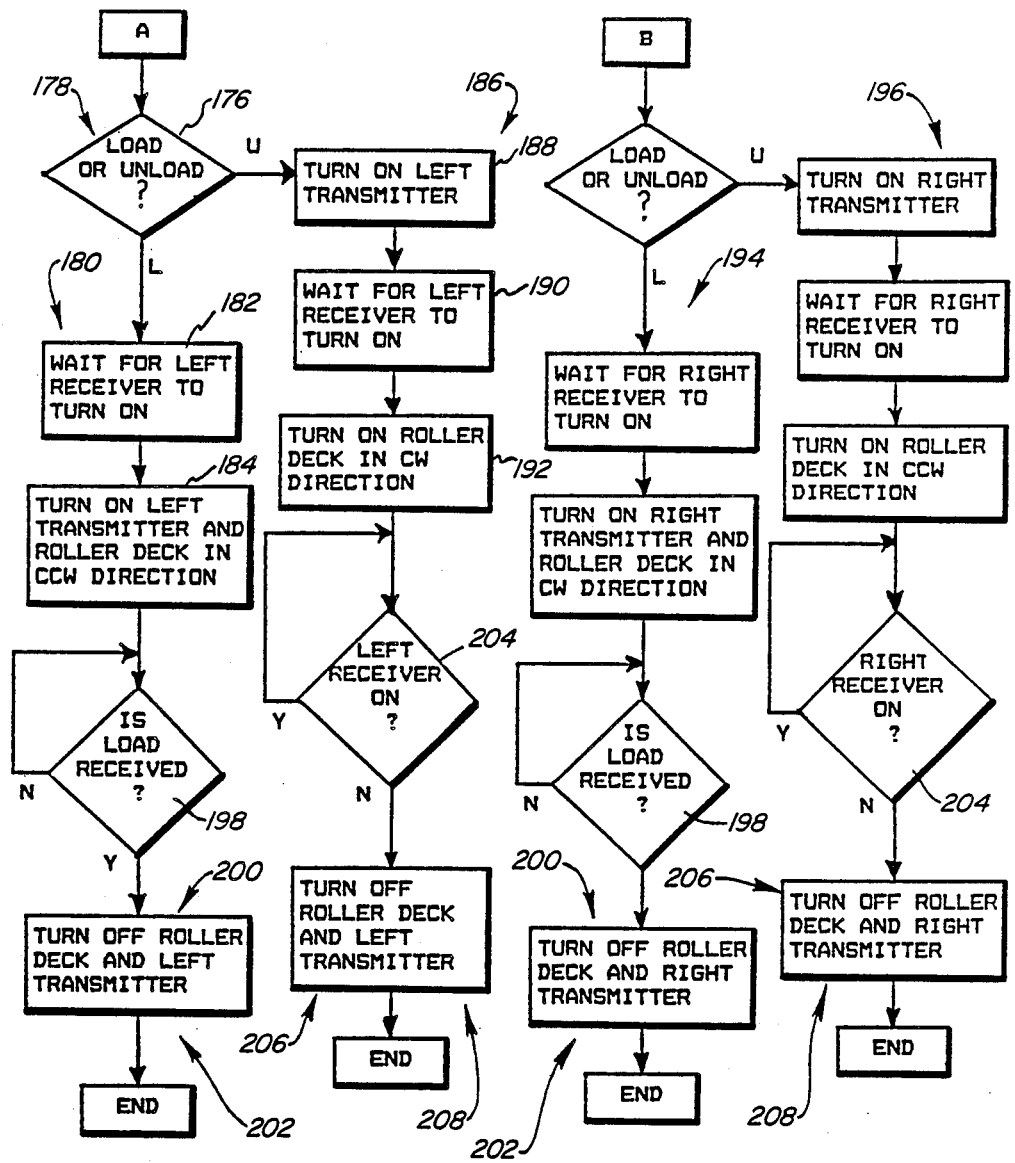

Operation of the apparatus 8 is best described in relation to the software represented by the flowcharts shown in FIGS. 6A and 6B. For the purposes of the following discussion, it is assumed that the SGV has successfully guided itself through the factory environment and has arrived at the docking station 50 and is in the process of either receiving or depositing a load. Generally, the vehicle control means 64 acts under software control to deliver pulse control signals to the first and second radiant energy emitting means 72,80, monitors the first and second radiant energy detecting means 74,82 for a preselected duration of time, and controls the direction of energization of the roller deck motor 44 responsive to receiving an electrical signal from one of the first and second radiant energy detecting means 74,82. More specifically, the vehicle control means 64 first attempts to determine where the docking station is located (left or right). At block 158, the left and right infrared transmitters 72,80 are pulsed on. If the vehicle is positioned properly, the 90 will receive the pulsed signal from either the left or right emitting means 72,80 and will respond by pulsing its own emitting means 92 at the same frequency for a duration of about 1 second.

Thus, at block 160 the status of the left and right infrared receivers ar checked. The microprocessor 66 reads the inputs from the frequency control means 68,76. In decision block 162 a determination is made whether the docking station 50 is to the left of the vehicle 10. If no signal is received from the frequency control circuit 76, control passes to block 164 where a check is made to determine if the docking station is to the right of the vehicle 10. Assuming that neither detecting means 82,74 has received a signal from the emitting means 92 control will pass through block 166, where a software timer is incremented, to decision block 168. From here, control returns to the beginning of the loop at block 160 as long as the timer has not reached five seconds. Once this time period has elapsed, the vehicle controller 64 informs the land base computer that communication cannot be established with the docking station 50 and the routine ends.

On the other hand, if at some time during the five second period, a signal is received by the left or right detecting means 82,74 control will respectively pass to blocks 172,174. At block 172 the vehicle control means 64 has determined that the vehicle 10 will load or unload on its left side. Alternatively, at block 174 the vehicle control means 174 has determined that the vehicle 10 will load or unload on its right side. Further, in blocks 172,174 the left and right emitting means 80,72 are turned off. Hereafter, control passes to either the A or B routines illustrated on FIG. 6B for an actual determination of which direction the vehicle roller deck motor 44 should be energized.

Referring first to the A routine of FIG. 6B where the vehicle loads or unloads on its left side, the routine must "know" whether it is to deliver or accept a load. The control means 64 includes means 178 for delivering an unload signal to cause the vehicle to deliver a load from the vehicle roller deck 30 to the docking station roller deck 58 and delivering a load signal to cause the roller deck 30 of the vehicle 10 to receive a load from the docking station roller deck 58. The means 178 preferably includes a land base computer (not shown) which is centrally located and in radio communication with the vehicle 10 and docking station 50. The land base computer controls the overall operation of the factory by issuing commands to the vehicle 10. For example, the land base typically commands the vehicle 10 to proceed to a known docking station location and either pick up or deliver a load. The docking station 50 is does not receive commands from the land base computer, but determines on its own that it needs to unload by detecting a load on its roller deck 57. Thus, the land base manages the entire system at a high level, issuing only general commands and allowing the onboard intelligence of the vehicle 10 and docking station 50 to control the lower level tasks.

Clearly, whether the vehicle is to load or unload is determinative of which direction the roller deck motor 44 must be energized. At decision block 176 means 178 checks to determine whether the land base computer has issued a load or unload command. Assuming that the vehicle 10 is to receive a load, control passes to a first vehicle transfer means 180 which energizes the electric motor 44 in a first direction in response to receiving the electrical signal from the first radiant energy detecting means 82 and the load signal. At block 182 the routine simply waits for the left detecting means 82 to turn on. This indicates to the vehicle 10 that the docking station 50 is ready to turn on its roller deck motor 54 and transfer the load to the vehicle 10. The routine responds in block 184 by energizing its motor 44 in the counterclockwise direction to accept the load. At the same time, the routine also energizes the emitting means 82 thereby causing the docking station to energize its own electric motor 57 and begin the transfer.

Alternatively, assuming that the land base computer issued an unload signal to the vehicle 10, control would pass from decision block 176 to a second vehicle transfer means 186 which energizes the vehicle electric motor 44 in a second direction in response to receiving the electrical signal from the first radiant energy detecting means 82 and the unload signal. In this case, not only is the direction of the motor 44 reversed, but the communications protocol is also altered. In block 188 the left emitting means 80 is turned on and control passes to block 190 where the routine waits for the docking station 50 to respond by turning on the emitting means 92 and energizing the electric motor 57 to accept the load. In block 192 the routine energizes the vehicle motor 44 in the clockwise direction and begins the transfer.

If the vehicle 10 is transferring loads on its right side the B routine is executed substantially identical to the A routine differing only in the direction the motor 44 is energized. The B routine includes a third vehicle transfer means 194 which energizes the electric motor 44 in the second direction in response to receiving the electrical signal from the second radiant energy detecting means 74 and the load signal. The third vehicle transfer means 194 differs from the first vehicle transfer means 180 only, in that, the right emitting and detecting means 72,74 are used and the motor 44 is energized in the clockwise direction.

Similarly, a fourth vehicle transfer means 196 energizes the electric motor 44 in the first direction in response to receiving the electrical signal from the second radiant energy detecting means 74 and the unload signal. The fourth vehicle transfer means 194 differs from the second vehicle transfer means 186 only, in that, the right emitting and detecting means 72,74 are used and the motor 44 is energized in the counterclockwise direction.

Means 157 detects the presence of a load on the vehicle roller deck 30 and delivers a load received signal. This load received signal is used to terminate operation of the vehicle and docking station motors 44 because the transfer to the vehicle 10 is complete. Decision blocks 198 in the load portions of the A and B routines simply wait for the load received signal and pass control to means 200 for deenergizing the vehicle electric motor 44 in response to receiving the load received signal.

At this time, the loading of the vehicle is complete and all that remains is to signal the docking station 50 that the process is accomplished. Means 202 signals the docking station 50 by deenergizing the first and second radiant energy emitting means 72,80.

The completion of the unload portions of the A and B routines is slightly different because the docking station 50 receives the load and realizes the completion of the transfer. The docking station 50 must signal the vehicle 10 when the load is received. Accordingly, decision blocks 204 simply wait for the signal from the detecting means 74,82 to go to a low value, indicating that the docking station 50 has received the load and deenergized the emitting means 90. The second and fourth transfer means 186,196 include means 206 for deenergizing the vehicle electric motor 44 in response to the absence of the electrical signal from both the first and second radiant energy detecting means. Finally, means 208 deenergizes the first and second radiant energy emitting means 72,80. The loading/unloading process is complete and the vehicle is free to travel to the next location commanded by the land base.

The docking station control means 65 is substantially similar to a portion of the vehicle control means 64. The docking station has need for only one of the load transfer routines A and B since it does not have left and right modes of operation. The docking station control means operation is identical to the A routine except for the reference to the left detecting and emitting means 82,80. Because the docking station has only the single detecting and emitting means 90,92 left has no meaning in its control scheme. Therefore, by considering the references to the left detecting and emitting means 82,80 to be references to the detecting and emitting means 90,92, the operation of the docking station control means can be easily understood.

Other aspects, objects, and advantages of this invention can be obtained from a study of the drawings, the disclosure, and the appended claims.

I claim:

1. An apparatus for controlling the operation of a powered conveyor of a self guided vehicle in coordination with a powered conveyor of a docking station, the vehicle and docking station conveyors each driven by an electric motor, the apparatus comprising:

first and second radiant energy emitting means for producing pulsed radiant energy in response to receiving respective pulse control signals, the first and second radiant energy emitting means being mounted on opposing sides of the vehicle and directed generally outward from the vehicle;

third radiant energy emitting means for producing pulsed radiant energy in response to receiving a pulse control signal, the third radiant energy emitting means being mounted on the docking station and generally directed outward from the docking station;

first and second radiant energy detecting means for producing electrical signals responsive to receiving radiant energy from the third radiant energy emitting means, the first and second radiant energy detecting means being mounted on opposing sides of the vehicle and directed generally outward from the vehicle;

third radiant energy detecting means for producing electrical signals responsive to receiving radiant energy from one of the first and second radiant energy emitting means, the third radiant energy detecting means being mounted on the docking station and directed generally outward from the docking station;

vehicle control means for delivering pulse control signals to the first and second radiant energy emitting means, monitoring the first and second radiant energy detecting means for a preselected period of time, and controlling the direction of energization of the vehicle electric motor responsive to receiving an electrical signal from one of the first and second radiant energy detecting means;

docking station control means for delivering pulse control signals to the third radiant energy emitting means, monitoring the third radiant energy detecting means, and controlling the energization of the docking station electric motor responsive to receiving an electrical signal from the third radiant energy detecting means; and load transfer means for loading onto the vehicle conveyor from the docking station conveyor at either side of the vehicle, and unloading from the vehicle conveyor onto the docking station conveyor at either side of the vehicle.

2. An apparatus for controlling the operation of a powered conveyor of a self guided vehicle in coordination with a powered conveyor of a docking station, the vehicle and docking station conveyors each driven by an electric motor, the apparatus comprising:

first and second radiant energy eimtting means for producing pulsed radiant energy in response to receiving respective pulse control signals, the first and second radiant energy emitting means being mounted on opposing sides of the vehicle and generally directed outward from the vehicle;

third radiant energy emitting means for producing pulsed radiant energy in response to receiving a pulse control signal, the third radiant energy emitting means being mounted on the docking station and generally directed outward from the loading end of the docking station;

first and second radiant energy detecting means for producing electrical signals responsive to receiving radiant energy from the third radiant energy emitting means, the first and second radiant energy detecting means being mounted on opposing sides of the vehicle and generally directed outward from the vehicle;

third radiant energy detecting means for producing electrical signals responsive to receiving radiant energy from one of the first and second radiant energy emitting means, the third radiant energy detecting means being monnted on the docking station and generally directed outward from the loading end of the docking station; and vehicle control means for delivering pulse control signals to the first and second radiant energy emitting means, monitoring the first and second radiant energy detecting means for a preselected period of time, and controlling the direction of energization of the vehicle electric motor responsive to receiving an electrical signal from one of the first and second radiant energy detecting means;

means for delivering an unload signal to cause the vehicle to deliver a load from the vehicle conveyor to the docking station conveyor and delivering a load signal to cause the conveyor of the vehicle to receive a load from the docking station conveyor;

first load transfer means for energizing the vehicle electric motor in a first direction in response to receiving the elecrtrical signal from the first radiant energy detecting means and the unload signal;

second load transfer means for energizing the vehicle electric motor in a second direction in response to receiving the electrical signal from the first radiant energy detecting means and the unload signal;

third load transfer means for energizing the vehicle electric motor in the first direction in response to receiving the electrical signal from the second radiant energy detecting means and the load signal; and fourth load transfer means for energizing the vehicle electric motor in the second direction in response to receiving the electrical signal from the second radiant energy detecting means and the unload signal.

3. An apparatus, as set forth in claim 2, including means for detecting the presence of a load on the vehicle conveyor and delivering a vehicle load fully-on signal wherein the first and third load transfer means include means for deenergizing the vehicle electric motor in response to receiving the vehicle load fully-on signal.

4. An apparatus, as set forth in claim 3, wherein the first and third load transfer means includes means for deenergizing the first and second radiant energy emitting means in response to receiving the vehicle load fully-on signal.

5. An apparatus, as set forth in claim 4, including a docking station control means for controlling the direction of energization of the docking station electric motor in response to receiving both an electrical signal from the third radiant energy detecting means and one of the load and unload signal.

6. An apparatus, as set forth in claim 5, wherein the docking station control means includes means for energizing the docking station electric motor in a first direction to response to receiving both the electrical signal from the third radiant energy detecting means and the load signal; and means for energizing the docking station electric motor in a second direction in response to receiving both the electrical signal from the third radiant energy detecting means and the unload signal.

7. An apparatus, as set forth in claim 2, wherein the second and fourth load transfer means include means for deenergizing the vehicle electric motor in response to the absence of the electrical signal from both the first and second radiant energy detecting means.

8. An apparatus, as set forth in claim 7, wherein the second and fourth load transfer means include means for dennergizing the first and second radiant energy emitting means in response to the absence of the electrical signal from both the first and second radiant energy detecting means.

9. An apparatus, as set forth in claim 8, including means for detecting the presence of a load on the docking station conveyor and delivering a station load fully-on signal wherein the second and fourth load transfer means includes means for deenergizing the third radiant energy emitting means in response to receiving the station load fully-on signal.

10. An apparatus, as set forth in claim 4, wherein the first and third load transfer means include means for deenergizing the third radiant energy emitting means in response to the absence of the electrical signal from the third radiant energy detecting means.

* * * * *

UNITED STATES PATENT AND TRADEMARK OFFICE
CERTIFICATE OF CORRECTION

PATENT NO. : 4,792,995

DATED : December 20, 1988

INVENTOR(S) : Joseph J. Harding

It is certified that error appears in the above-identified patent and that said Letters Patent is hereby corrected as shown below:

Claim 2, line 48 (column 10, line 45): delete "unload" and insert --load--.

Claim 6, line 4 (column 11, line 12): delete "to" (first occurrence) and insert --in--.

Signed and Sealed this

Thirtieth Day of May, 1989

Attest:

DONALD J. QUIGG

Attesting Officer

Commissioner of Patents and Trademarks